US012017895B2

(12) United States Patent
Merritt et al.

(10) Patent No.: US 12,017,895 B2
(45) Date of Patent: Jun. 25, 2024

(54) LOAD SUPPORT DEVICE AND SYSTEM

(71) Applicants: Merritt Arboreal Design, Inc., Aptos, CA (US); Thompson Tree Tools, LLC, Ithaca, NY (US)

(72) Inventors: Jaime A. Merritt, Aptos, CA (US); Morgan Thompson, Ithaca, NY (US)

(73) Assignees: Merritt Arboreal Design, Inc., Aptos, CA (US); Thompson Tree Tools, LLC, Ithaca, NY (US)

( * ) Notice: Subject to any disclaimer, the term of this patent is extended or adjusted under 35 U.S.C. 154(b) by 49 days.

(21) Appl. No.: 17/376,708

(22) Filed: Jul. 15, 2021

(65) Prior Publication Data

US 2022/0017338 A1 Jan. 20, 2022

Related U.S. Application Data

(60) Provisional application No. 62/705,802, filed on Jul. 16, 2020.

(51) Int. Cl.
*B66D 5/32* (2006.01)

(52) U.S. Cl.
CPC .................................... *B66D 5/32* (2013.01)

(58) Field of Classification Search
CPC . B66D 1/36; B66D 3/10; B66D 3/046; B66D 5/32; B66D 5/00; A62B 1/06; A62B 1/14; A62B 1/18; A62B 1/20; A62B 35/0081; A63B 27/00; A63B 29/02; A63B 29/08; A63B 29/024
USPC .......................................... 254/391; 182/133
See application file for complete search history.

(56) References Cited

U.S. PATENT DOCUMENTS

| | | | | | |
|---|---|---|---|---|---|
| 3,705,708 | A * | 12/1972 | Cunningham | B66D 3/04 294/82.11 |
| 4,103,872 | A * | 8/1978 | Hirasuka | B66D 1/58 254/362 |
| 4,431,352 | A * | 2/1984 | Andrews | F16G 15/08 248/500 |
| 5,056,760 | A * | 10/1991 | Jorgensen | B66D 3/046 254/402 |
| 5,360,083 | A * | 11/1994 | Hede | A62B 1/14 182/5 |
| 6,244,570 | B1 * | 6/2001 | Habberstad | B66D 3/06 254/416 |

(Continued)

FOREIGN PATENT DOCUMENTS

| | | | | |
|---|---|---|---|---|
| CN | 106362325 A * | 2/2017 | A62B 35/0081 |
| CN | 207871291 U | 9/2018 | |

(Continued)

*Primary Examiner* — Michael R Mansen
*Assistant Examiner* — Henrix Soto
(74) *Attorney, Agent, or Firm* — TraskBritt

(57) ABSTRACT

A load support device and load support systems. The load support device may include a body. The body may include a first fixed bollard. The body may additionally include a pivotable bollard. The pivotable bollard and the first fixed bollard may be configured such that friction is applied to a line between the first fixed bollard and the pivotable bollard without locking the line to preclude movement in response to a force applied to the pivotable bollard. A load support system may include a load support device and a line threaded through a body of the load support device in one of several different line configurations.

17 Claims, 11 Drawing Sheets

(56) References Cited

U.S. PATENT DOCUMENTS

| | | | | |
|---|---|---|---|---|
| 6,378,650 | B2 * | 4/2002 | Mauthner | A62B 1/10 182/5 |
| 7,562,862 | B1 * | 7/2009 | Jackson | B66D 3/14 254/391 |
| 7,658,264 | B2 * | 2/2010 | Mauthner | B66D 3/046 182/5 |
| 7,845,467 | B2 * | 12/2010 | Petzl | A62B 1/14 182/71 |
| 8,226,138 | B2 * | 7/2012 | Rocourt | G01B 11/0608 294/82.34 |
| 2010/0126802 | A1 | 5/2010 | Delaittre et al. | |
| 2011/0204306 | A1 * | 8/2011 | Kingery | B66D 3/046 254/391 |
| 2016/0001100 | A1 * | 1/2016 | Hirst | A62B 1/14 182/236 |
| 2017/0137091 | A1 * | 5/2017 | Chih | B63B 21/08 |
| 2019/0099626 | A1 * | 4/2019 | Codega | A62B 1/14 |
| 2020/0164232 | A1 * | 5/2020 | Mathe | A62B 1/14 |

FOREIGN PATENT DOCUMENTS

| | | | |
|---|---|---|---|
| EP | 3332829 | A1 | 6/2018 |
| FR | 2478475 | A2 | 9/1981 |
| FR | 2721523 | A1 | 12/1995 |
| GB | 2367048 | A | 3/2002 |
| RU | 2137519 | C1 | 9/1999 |

* cited by examiner

LOAD SUPPORT DEVICE AND SYSTEM

CROSS-REFERENCE TO RELATED APPLICATION

This application claims the benefit under 35 U.S.C. § 119(e) of U.S. Provisional Patent Application Ser. No. 62/705,802, filed Jul. 16, 2020, and entitled "LOAD SUPPORT DEVICE AND SYSTEM, AND RELATED METHODS," the disclosure of which is hereby incorporated herein in its entirety by this reference.

TECHNICAL FIELD

Embodiments of the present disclosure relate to load support devices and systems, and to related methods of forming and using such load support devices and systems.

BACKGROUND

Load support devices may be used in a rigging system to lift and lower loads. For example, a load support device may be used as part of a system involving rope, pulleys, and one or more objects to be lifted and suspended using the device. Load support devices may also be used in other contexts such as rock climbing and other activities.

Load support devices generally include one or more pulleys mounted between a pair of plates, and a rope wound around the pulleys in either a U-shape (for single pulley devices) or an S-shape (for multiple pulley devices). One or more of the pulleys can be rotationally and/or positionally fixed between the pair of plates. Some load support devices may have a free-flow position in which the rope can freely pass through the system in either direction, and a locked position in which the rope is clamped between one or more cams or wedges. Some load support devices include one or more cams or wedges that can be used to limit movement of the rope to a single direction. Other load support devices may include a lever to manually transition between a free-flow position and locked position.

BRIEF SUMMARY

Embodiments of the present disclosure may include a load support device and load support systems. A load support device may include a body. The body may include a first fixed bollard. The body may additionally include a movable bollard. The movable bollard and the first fixed bollard may be configured such that friction is applied to a line between the first fixed bollard and the movable bollard without locking the line to preclude movement in response to a force applied to the movable bollard.

Another embodiment of the present disclosure may include a load support device. The load support device may include a body. The body may include a first plate. The body may also include a second plate connected to the first plate. The body may additionally include a pivotable bollard connected to the first plate. The body may further include a first fixed bollard connected to the second plate. The load support device may also include an attachment element connected to the body. The pivotable bollard and the first fixed bollard may be configured such that friction is applied to a line between the first fixed bollard and the pivotable bollard without locking the line to preclude movement in response to a force applied to the pivotable bollard.

Another embodiment of the present disclosure may include a load support system. The load support system may include an attachment element. The load support system may also include body. The body may include a first plate. The body may also include a second plate connected to the first plate. The body may additionally include a first fixed bollard connected to the second plate. The body may further include a second fixed bollard connected to the second plate. The body may also include a pivotable bollard connected to the first plate. The load support system may additionally include a line threaded through the body. The pivotable bollard may be configured to pivotably rotate toward the first fixed bollard and apply friction to the line without locking the line to preclude movement.

DETAILED DESCRIPTION

Figure 1:
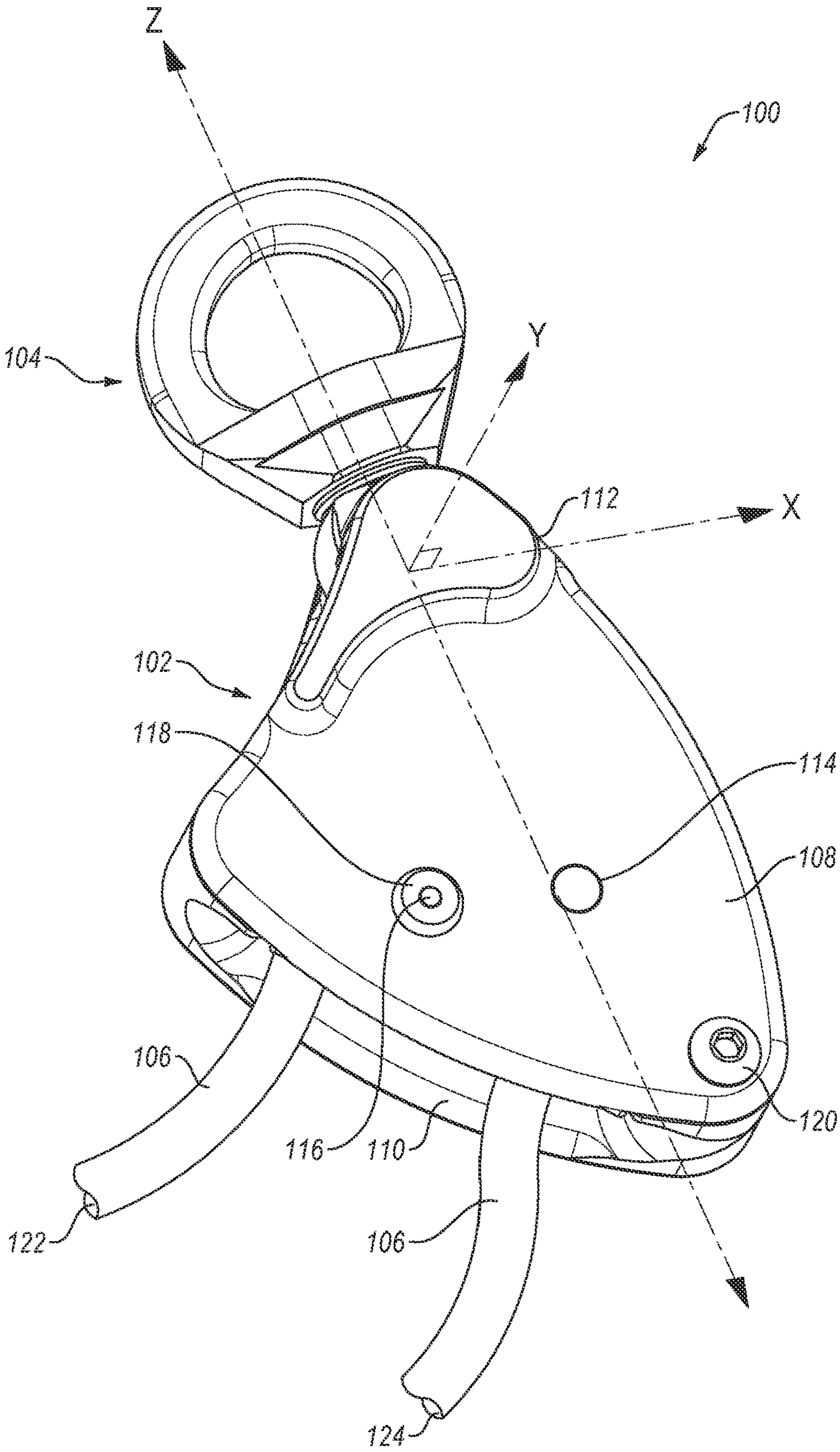
FIG. 1 is a perspective view of an embodiment of a load support device of the present disclosure in a closed state.

Load support devices that only have binary free-flow and locked positions limits the ability for load support devices to control the speed of raising and lowering loads. Additionally, load support devices that employ cams or wedges to limit movement of the rope to a single direction or completely clamp on the rope to stop any motion may not be desirable in situations where an operator wants to control the speed at which a load is lowered and raised. Additionally, having a manual lever to control the friction on a rope for lowering or raising a load limits the ability to position the load support device out of reach of a device operator or requires multiple load control devices within a system. Furthermore, load support devices that operate in conjunction with control systems to remotely control the friction on a rope increases costs, which may be undesirable.

Accordingly, it may be desirable to have a load support device that can operate in a nonactivated position in which a line can freely pass through the load support device, and an activated position in which the load support devices creates friction on a line in response to a load or a control force on the line without locking the line to preclude movement. Additionally, it may be desirable to have a load support device that can apply friction to the line for raising or lowering a load without the need for a manual lever or a control system. Such a device may be more positionally versatile and more cost-effective to manufacture and assemble than conventional devices. For example, the current load support device may be hoisted in the air as part of a rigging system while still providing desired functionality. Additionally, a rope, cable, wire, strap, etc., may be threaded through the load support device in different configurations to achieve desired functionality. For example, the current load support device may prevent inattentive climbers from severely injuring themselves or others because of the self-actuating mechanism that applies friction to a line responsive to a load and control force on the line.

The following description provides specific details, such as components, assembly, and materials in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional components and fabrication techniques employed in the industry. Also note, any drawings accompanying the present application are for illustrative purposes only, and are thus not drawn to scale. Additionally, elements common between figures may retain the same numerical designation.

As used herein, the terms "comprising" and "including," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature, or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," etc., are used for clarity and convenience in understanding the disclosure and accompanying drawings and does not connote or depend on any specific preference, orientation, or order, except where the context clearly indicates otherwise.

As used herein, the term "about," when used in reference to a numerical value for a particular parameter, is inclusive of the numerical value and a degree of variance from the numerical value that one of ordinary skill in the art would understand is within acceptable tolerances for the particular parameter. For example, "about," in reference to a numerical value, may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "substantially," in reference to a given parameter, property, or condition, means to a degree that one skilled in the art would understand that the given parameter, property, or condition is met with a small degree of variance, such as within acceptable manufacturing tolerances.

As used herein, the term "configured" refers to a shape, material composition, and arrangement of one or more of at least one structure and at least one apparatus facilitating operation of one or more of the structure and the apparatus in a pre-determined or intended way.

As used herein, the term "bollard" means a guiding surface of a load support device over which a line slides, with accompanying friction, during use of the load support device.

Figure 2:
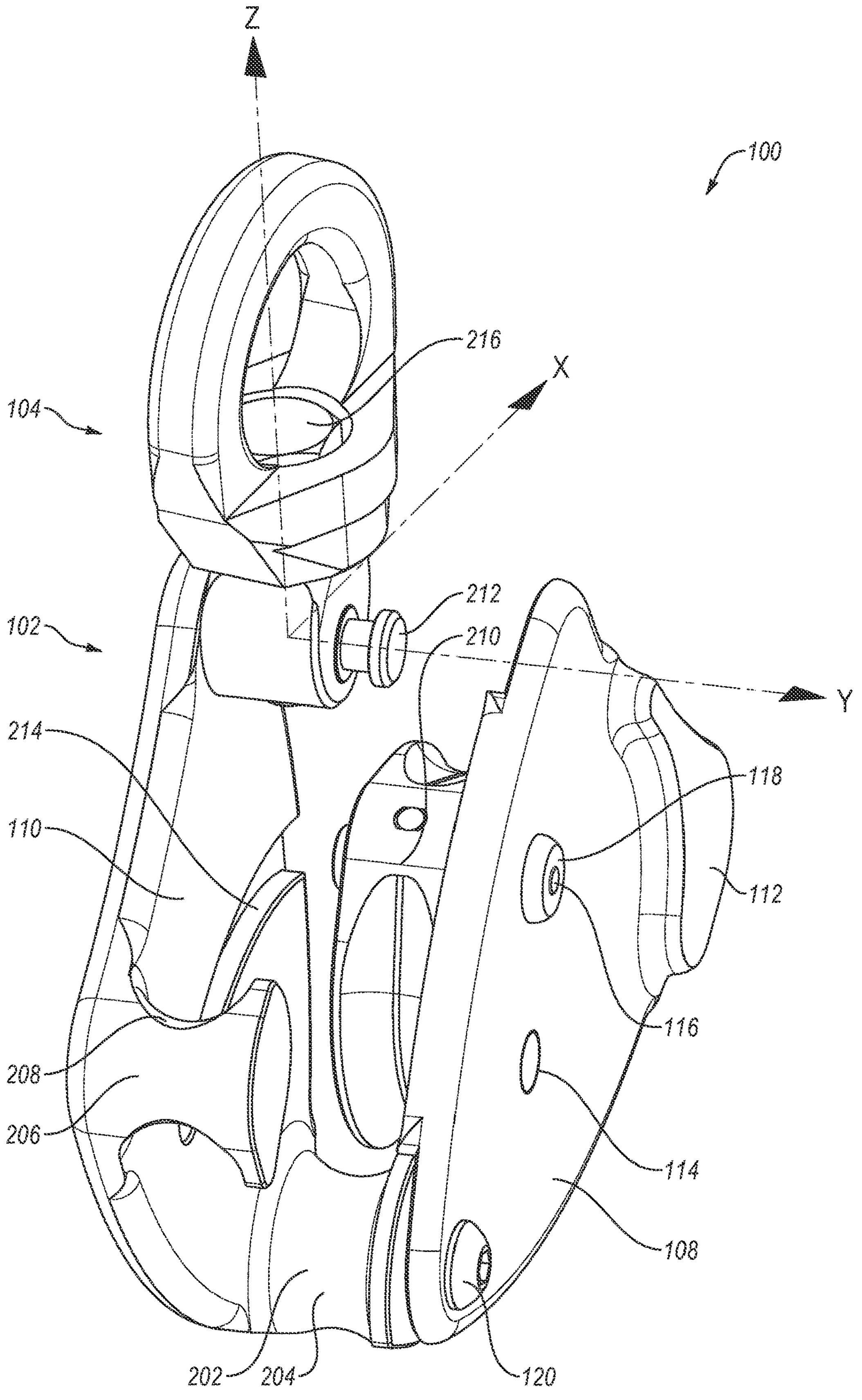
FIG. 2 is a perspective view of the load support device of FIG. 1 in an open state.

FIGS. 1-10 illustrate an example embodiment of a load support device 100 in accordance with the present disclosure. FIG. 1 illustrates the load support device 100 in a closed state. FIG. 2 illustrates the load support device 100 in an open state. Referring collectively to FIGS. 1-2, the load support device 100 may include a body 102 and an attachment element 104 connected to a body 102. The load support device 100 may be configured to couple a line 106 (e.g., cable, rope, wire, strap, etc.) to a load (e.g., any object to be raised, lowered, or otherwise moved, such as timber or a person) as part of a load support system. For example, the line 106 may be threaded through the body 102 and include a first end 122 that is not secured to a load and a second end 124 that is secured to a load.

The load support device 100 and any sub-components of the load support device 100 may be manufactured from any type of material that a person of ordinary skill in the art would recognize as suitable for the various applications of the load support device 100. By way of non-limiting example, such materials may include any metal (including alloys), a composite material (e.g., fiberglass, carbon fiber composites, etc.), a polymer material, or any combination or sub-combination thereof.

The load support device 100 may include body 102 comprising a first plate 108 including an interior surface. The body 102 may include a second plate 110 including an interior surface. The body 102 may include a first fixed bollard 202 connected to the interior surface of the second plate 110. The body 102 may also include a second fixed bollard 206 connected to the interior surface of the second plate 110. The second fixed bollard 206 may operate as a fairlead in that it is the first surface that the line 106 contacts when the line is threaded through the load support device 100. In some embodiments, the first fixed bollard 202 may operate as a fairlead instead of the second fixed bollard 206.

The body 102 may additionally include a movable bollard (e.g., pivotable bollard 210, a sliding bollard, etc.) connected to a first elongated structure 116 and rotatable about the first elongated structure 116. The first elongated structure 116 may be secured to a securing point 118 of the first plate 108. The body 102 may further include an attachment element 104 connected to a second elongated structure 212 and rotatable about the second elongated structure 212. The second elongated structure 212 may be secured to the interior surface of the second plate 110. The first plate 108 may be connected to the second plate 110, with the interior surface of the first plate 108 facing the interior surface of the second plate 110. In some embodiments, the first plate 108 may be connected to the second plate 110 and rotatable relative the second plate 110. For example, the first plate 108 may be connected to the second plate 110 by a fastener 120

(e.g., bolt, screw, nail, pin, etc.) that enables relative rotational motion between the first plate 108 and the second plate 110.

The load support device 100 may be configured to transition between a closed state and an open state. In the closed state, the first plate 108 may be aligned with the second plate 110. In the open state, the first plate 108 may be misaligned with the second plate 110. The open state may facilitate easier threading of the line 106 through the load support device 100. The closed state may be used to secure the line 106 within the load support device 100 during use.

To facilitate the load support device 100 in transitioning between a closed state and an open state, the first plate 108 may include a connection feature 112 (e.g., hook, groove, pocket, etc.) configured to receive a second elongated structure 212 (e.g., rod, bolt, pin, etc.) secured to the second plate 110. Additionally, the second plate 110 may include a connection groove 214 configured to receive a portion of the first elongated structure 116. For example, the connection groove 214 may be radially centered about the fastener 120 and may guide rotational movement of the first plate 108 to relative to the second plate 110. In some embodiments, the first plate 108 and the second plate 110 (collectively, the "plates") may each exhibit a generally triangular shape. The generally triangular shape may enable the plates to rotatably transition between the closed state and the open state without an edge of the first plate 108 contacting the attachment element 104 or the second elongated structure 212.

Certain features of the load support device 100 may directionally limit transitioning between the closed state and the open state. For example, while the load support device 100 is in the closed state, the connection feature 112 may prevent rotational movement of the first plate 108 in one direction (e.g., counterclockwise in the X-Z plane) relative to the second plate 110. Additionally, while the load support device 100 is in the closed state, the connection feature 112 may enable rotational movement of the first plate 108 in another direction (e.g., clockwise in the X-Z plane) relative to the second plate 110. In other words, while the load support device 100 is in the closed state and the first plate 108 is rotated clockwise relative to the second plate 110, the second elongated structure 212 disengages from the connection feature 112, which transitions the load support device 100 to the open state. While the load support device is in the closed state and the first plate 108 is rotated counterclockwise relative to the second plate 110, the second elongated structure 212 is forced into the connection feature 112, preventing the first plate 108 from further rotating counterclockwise relative to the second plate 110.

The attachment element 104 may be configured to connect to another line, equipment (e.g., belt, harness, etc.), or a structure (e.g., tie-off point, beam, hook, etc.). As non-limiting examples, the attachment element 104 may include a hook, eye-bolt, strap, etc. In some embodiments, the attachment element 104 may be rotatable about the second elongated structure 212 secured to the second plate 110. For example, the attachment element 104 may be configured to rotate about two perpendicular independent axes (e.g., X-axis and Z-axis) referenced from the second elongated structure 212. A Z-axis and Z-direction is aligned with a third elongated structure 216 in the attachment element 104. An X-axis and X-direction is in a plane parallel to the two plates. A Y-axis and Y-direction is perpendicular to each of the X-axis and the Y-axis and perpendicular to the two plates. The attachment element 104 may be rotatable relative to the rest of the load support device 100 about the Z-axis, as well as about the Y-axis. The dual-axis rotation enables the attachment element 104 to self-orient toward a line threaded through the attachment element 104. Self-orientation of the attachment element 104 may reduce the amount of force needed to control loads attached to the line 106. Additionally, self-orientation of the attachment element 104 may reduce pinch-points and other safety hazards associated with rigging operations.

To prepare the load support device 100 for use in operation, the load support device 100 may be in a closed state. A user may open the load support device 100 to an open state. A user may thread a line through the load support device 100 in a first, second, third, fourth, or fifth line configuration, each of which is described in detail below with reference to FIGS. 5-9. A user may then return the load support device 100 to the closed state.

During operation of the load support device 100 with a line that is threaded through the body 102 in one of the line configurations of FIGS. 5-9 and attached to a load, forces on the load support device 100 may bias the load support device 100 into the closed state and prevent the load support device 100 from opening. For example, the connection feature 112 may be secured to the first plate 108, and the movable bollard (e.g., the pivotable bollard 210, sliding bollard, etc.) may be secured to the first plate 108. A load applied to the line 106 in the first, second, third, fourth, or fifth line configuration pulls the pivotable bollard 210, which pulls the first plate 108 in one direction (e.g., counterclockwise in the X-Z plane) relative to the second plate 110. As the first plate 108 is forced in the counterclockwise direction relative to the second plate 110, the second elongated structure 212 is forced into the connection feature 112, which biases the load support device 100 in the closed state. The load support device 100 biasing into the closed state during operation may improve safety and the reliability of the load support device 100.

In other embodiments, the load support device 100 may not be opened and closed, but instead be formed in a permanently closed configuration. In other words, the first plate 108 may be fixedly secured to the second plate 110 to prevent rotational and translational motion therebetween. For example, the material of the first plate 108 and the second plate 110 may be secured together by crimping, welding, soldering, brazing, epoxy, etc. The first fixed bollard 202, and the second fixed bollard 206 may be fixedly secured to both the first plate 108 and the second plate 110. The attachment element 104 may be connected to both the first plate 108 and the second plate 110 and rotatable relative to the rest of the load support device 100 about the Z-axis, as well as about the Y-axis. The pivotable bollard 210 may be connected to the first elongated structure 116 and rotatable about the first elongated structure 116. The first elongated structure 116 may be secured to each the first plate 108 and the second plate 110. In other words, the pivotable bollard 210 may be rotatable between the two plates (e.g., in the X-Z plane).

Referring specifically to FIG. 1, the load support device 100 is in the closed state. In the closed state, the first plate 108 may be aligned with the second plate 110. The second elongated structure 212 may be received within the connection feature 112 of the first plate 108. While the load support device 100 is in the closed state, portion of the first elongated structure 116 extending beyond the pivotable bollard 210 and away from the first plate 108 may be received within the connection groove 214. The connection groove 214 may assist to support a load on the first elongated structure 116 when the line 106 is threaded through the body 102 and around the pivotable bollard 210 and then the line 106 is attached to a load. The connection groove 214 may also help to position the first elongated structure 116 perpendicular to the two plates so that rotational movement of the pivotable bollard is perpendicular to the first plate 108 and the second plate 110 (e.g., in the X-Z plane). The interior surface of the first plate 108 may be in contact with the second fixed bollard 206 while the load support device 100 is in the closed state. In other embodiments, there may be a small gap (e.g., less than ¼ of the Y-directional thickness of the second fixed bollard 206) between the interior surface of the first plate 108 and the second fixed bollard 206.

While the load support device 100 is in the closed state and not in use, there may be adequate clearance between any of the first fixed bollard 202, second fixed bollard 206, attachment element 104, and the pivotable bollard 210 to enable a user to thread the line 106 through the body 102 in any desired configuration. For example, the pivotable bollard 210 may be separated from the first fixed bollard 202, the second fixed bollard 206, and the attachment element 104 by at least the diameter of a line 106 that may be a standard size for rigging or climbing. In some embodiments, the first fixed bollard 202 and the second fixed bollard 206 may be secured proximate to an exterior edge of the second plate 110 and the pivotable bollard 210 may be secured proximal the center of the first plate 108.

Referring now to FIG. 2, the load support device 100 is in the open state. In the open state, the first plate 108 may be misaligned with the second plate 110. In other words, the first plate 108 has been rotated relative to the second plate 110 about the fastener 120 on which the first fixed bollard 202 is mounted. The second elongated structure 212 may be disengaged from the connection feature 112 of the first plate 108 while the load support device 100 is in the open state. The portion of the first elongated structure 116 extending beyond the pivotable bollard 210 and away from the first plate 108 may be disengaged from the connection groove 214. Furthermore, the interior surface of the first plate 108 may not be in contact with the second fixed bollard 206.

The first fixed bollard 202 may include a concave surface 204 to guide the line 106 while the line 106 is threaded through the body 102. The concave surface 204 may be smooth and rounded to prevent snagging, chafing, or fraying of the line 106. The first fixed bollard 202 may be fixedly secured to the first plate 108 or the second plate 110 with the concave surface 204 oriented into the body 102. The first fixed bollard 202 may be substantially aligned with the attachment element 104 along the Z-axis. In some embodiments, the first fixed bollard 202 may be formed unitarily (i.e., together in one piece) with the first plate 108 or the second plate 110.

The second fixed bollard 206 may include concave surface 208 to guide the line 106 while the line 106 is threaded through the body 102. The concave surface 208 may be smooth and rounded to prevent snagging, chafing, or fraying of the line 106. The second fixed bollard 206 may be fixedly secured to the first plate 108 or the second plate 110 with the concave surface oriented into the body 102. The second fixed bollard 206 may be offset (e.g., in the X-direction) from the Z-axis. In some embodiments, the second fixed bollard 206 may be formed unitarily (i.e., together in one piece) with the first plate 108 or the second plate 110. In certain embodiments, the second fixed bollard 206 may include a line securing element (e.g., cam, cleat, clamp, etc.) connected to the second fixed bollard 206 to secure and lock the line 106 in place to hold a load attached to the line 106 without assistance from an operator or user.

As previously mentioned, the pivotable bollard 210 may be configured to pivot about the first elongated structure 116 that may be secured to the first plate 108 and may be connected to the second plate 110. The first elongated structure 116 may be offset (e.g., in the X-direction) from the Z-axis and positioned between (e.g., in the X-Z plane) the first fixed bollard 202 and the second fixed bollard 206. Similarly, the pivotable bollard 210 may be offset (e.g., in the X-direction) from the Z-axis, with the Z-axis at least partially intersecting the pivotable bollard 210.

The pivotable bollard 210 may transition from the non-activated position to the activated position responsive to an applied rotational moment (e.g., clockwise or counterclockwise) about the pivotable bollard 210. To return the pivotable bollard 210 to the nonactivated position, the load support device 100 may include a biasing element 302. In other words, the biasing element 302 may be configured to bias the pivotable bollard 210 to the nonactivated position. In some embodiments, the biasing element 302 may be a component of the pivotable bollard 210. In other embodiments, the biasing element 302 may be external to the pivotable bollard 210. The biasing element 302 is described in further detail below with reference to FIG. 3.

Figure 3:
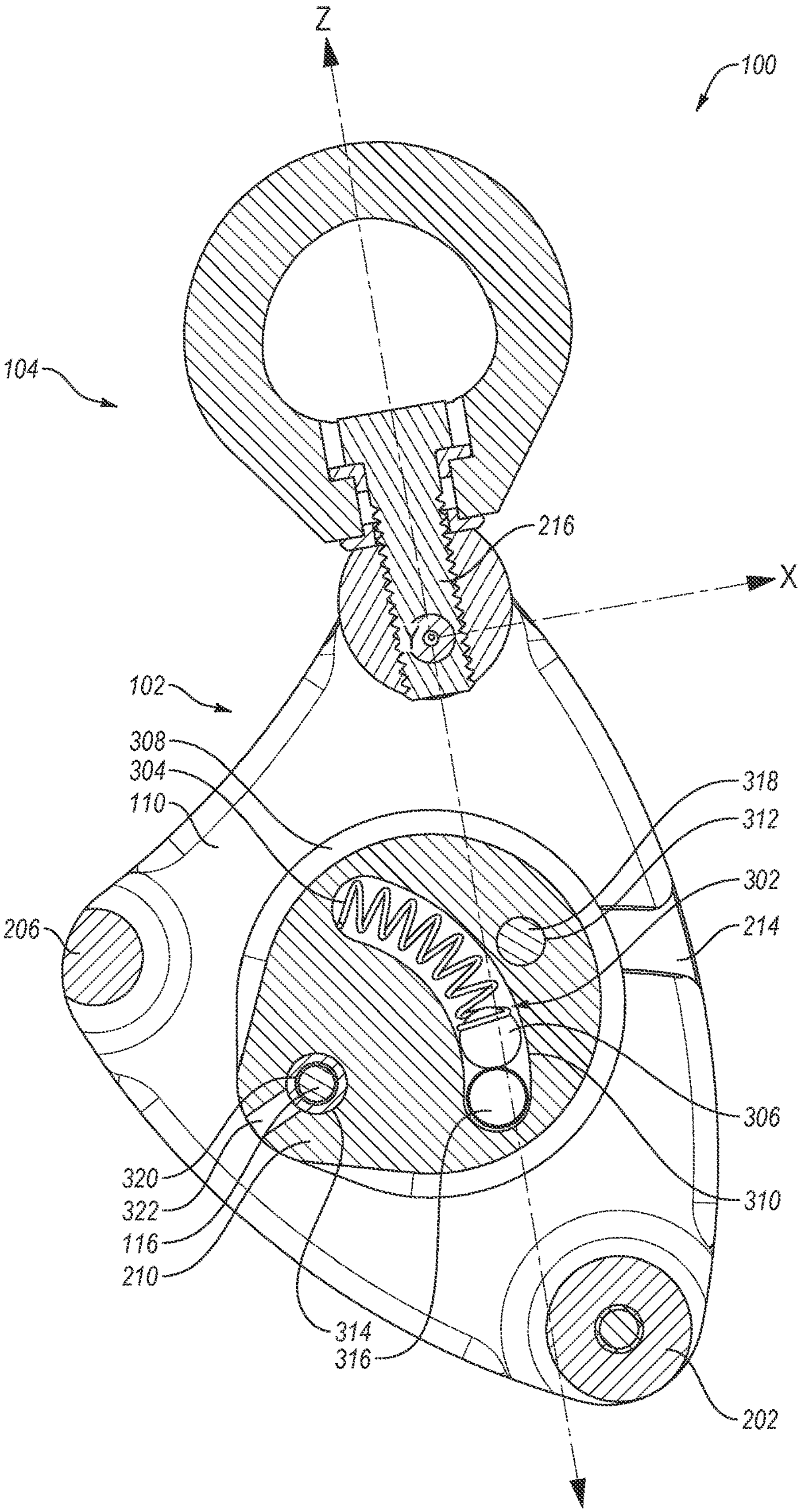
FIG. 3 is a cross-sectional view of the load support device of FIG. 1 in a closed state with a pivotable bollard in a nonactivated position.

FIG. 3 illustrates a cross-sectional view of the load support device 100 in a closed state with the pivotable bollard 210 in the nonactivated position.

The pivotable bollard 210 may include a first surface. The first surface may be substantially planar. The pivotable bollard 210 may also include a second surface that may be opposite to the first surface. The second surface may be parallel to the first surface. The pivotable bollard 210 may additionally include a concave surface 308 that connects the first surface and the second surface. The concave surface 308 may form a groove configured to guide the line 106 within the groove. The concave surface 308 may be smooth and rounded to prevent the line 106 from snagging, chafing, or fraying along the concave surface 308. In some embodiments, the pivotable bollard 210 may exhibit a generally cylindrical shape.

The pivotable bollard 210 may include a first hole 320 that may extend from the first surface through the second surface. In some embodiments, the first hole 320 may be positioned proximate an exterior edge of the pivotable bollard 210. The first hole 320 may receive a first elongated structure 116 (e.g., rod, pin, bolt, etc.). In other embodiments, the first hole 320 may receive a bearing 314 (e.g., bushing, rolling element bearing) and a first elongated structure 116 that may be positioned within the bearing 314. In these embodiments, the pivotable bollard 210 may also include a securing hole 322 within the concave surface 308 that extends into the first hole 320. The securing hole 322 may receive a securing element (e.g., set screw) to secure the bearing 314 within the first hole 320 of the pivotable bollard 210.

The load support device 100 may include at least one biasing element 302 configured to bias the pivotable bollard 210 to the nonactivated position. For example, the biasing element 302 may create force (e.g., a tension force, compression force, torsional force) opposing rotational movement of the pivotable bollard 210.

In some embodiments, the biasing element 302 may include a spring 304 positioned within a pocket 310 of the pivotable bollard 210. The biasing element 302 may optionally include a spherical element 306 positioned within the pocket 310 between the spring 304 and a pin 316 that is secured to the first plate 108. The spherical element 306 may facilitate a smooth operation of the pivotable bollard 210 between the nonactivated and activated positions. The spherical element 306 may include diameter that may be at least as large as a diameter of the spring 304. In some embodiments, the spring 304 may be axially aligned along a length (e.g., radially) of the pocket 310 and seated against an interior surface of the pocket 310. The spring 304 may have a stiffness sufficient to create a minimum threshold applied force to initiate rotational movement of the pivotable bollard 210. As a non-limiting example, the spring 304 may have a stiffness from about 0.5 Newtons per millimeter (N/mm) to about 90 N/mm, and more particularly from about 2.5 N/mm to about 20 N/mm. The pin 316 that is secured to the first plate 108 may be received within the pocket 310 on one end of the biasing element 302. This may enable rotational movement of the pivotable bollard 210 about the first elongated structure 116 (e.g., toward the first fixed bollard 202 while the load support device 100 is in the closed state). While the pin 316 is positioned within the pocket 310 against the biasing element 302, rotational (e.g., clockwise) movement of the pivotable bollard 210 about the first elongated structure 116 may compress the spring 304 of the biasing element 302 and create tension force opposing the rotational movement (e.g., a counterclockwise moment) of the pivotable bollard 210.

In other embodiments, the biasing element 302 may include at least one torsion spring. The torsion spring may have a first end connected to the pivotable bollard 210 and a second end connected to either the first plate 108 or the second plate 110. The torsion spring may have a stiffness sufficient to create a minimum threshold applied force to impart rotational movement of the pivotable bollard 210. For example, the torsion spring may have a stiffness from about 20 Newtons per radian (N/rad) to about 2500 N/rad, and more particularly from about 65 N/rad to about 450 N/rad.

In some embodiments, the pocket 310 may extend from the first surface of the pivotable bollard 210 into the pivotable bollard 210 without exiting through the second surface of the pivotable bollard 210. In other embodiments, the pocket 310 may have a portion that extends through the second surface of the pivotable bollard 210. In some embodiments, the pocket 310 may form a radial groove including a radius centered about the first hole 320 of the pivotable bollard 210. The pocket 310 may be substantially the same width as the pin 316 in one direction (e.g., X-direction) but the pocket 310 may be wider than the pin 316 in another direction (e.g., radially). The width of the pocket 310 in the radial direction and the length and stiffness of the biasing element 302 may limit the amount of rotational movement of the pivotable bollard 210. In other words, the geometry of the pocket 310 and the characteristics of the biasing element 302 may prevent the pivotable bollard 210 from rotating toward the first fixed bollard 202 to an extent that would lock and preclude movement of line 106 threaded between the pivotable bollard 210 and the first fixed bollard 202.

In some embodiments, the pivotable bollard 210 may include an additional pocket 312 within the first surface of the pivotable bollard 210. The additional pocket 312 may extend into the pivotable bollard 210 without extending through the second surface of the pivotable bollard 210. In some embodiments, the additional pocket 312 may receive a pocket element 318. For example, the additional pocket 312 may be substantially the same size and shape as the pocket element 318. In other embodiments, the pocket element 318 may be positioned within the pocket 310 on the opposite end of the pocket from the pin 316, with the biasing element 302 between the pocket element 318 and the pin 316.

In some embodiments, the pivotable bollard 210 may be locked in the nonactivated position to prevent rotational movement of the pivotable bollard 210 and enable the line 106 threaded within the load support device 100 to freely pass through the load support device 100. For example, the pocket element 318 may be configured to removably extend into a second hole 114 of the first plate 108. For example, the pocket element 318 may be a bar, rod, pin, etc., that may extend into and retract from a second hole 114 of the first plate 108 to rotationally lock or unlock the pivotable bollard 210. In additional embodiments, the pocket element 318 may be configured to engage and disengage with a connection point (e.g., groove, pocket) on the first plate 108 rather than extend into the second hole 114. For example, the pocket element 318 may be a ball and spring plunger that may extend into and retract from the connection point (e.g., groove, pocket) on the first plate 108 to rotationally secure and provide resistance to rotational movement of the pivotable bollard 210.

Figure 4:
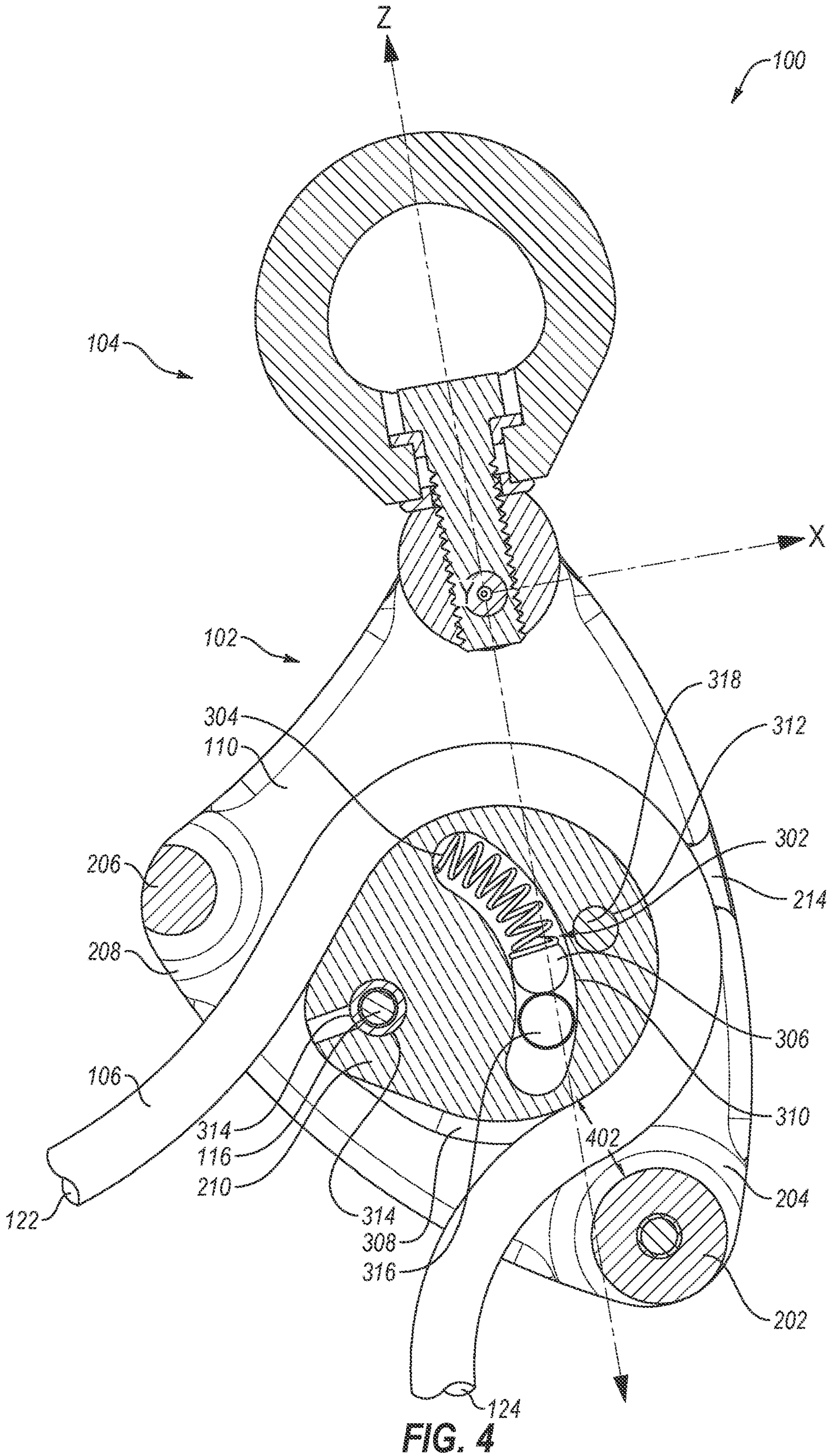
FIG. 4 is a cross-sectional view like that of FIG. 3 with the pivotable bollard in an activated position and illustrating a portion of line therein.

FIG. 4 illustrates a cross-sectional view of the load support device 100 in the closed state with the pivotable bollard 210 in the activated position, as would occur during normal operation with the line 106 secured to a load of sufficient weight to cause at least some rotation of the pivotable bollard 210 relative to the first and second plates (e.g., in the X-Z plane). As previously discussed, the pivotable bollard 210 is configured to pivot about the first elongated structure 116 toward the first fixed bollard 202 responsive to a rotational moment (e.g., clockwise moment) applied to the pivotable bollard 210. The rotational moment may be created by a load attached to the line 106 while the line 106 is threaded around the pivotable bollard 210. Rotational movement of the pivotable bollard 210 toward the first fixed bollard 202 reduces a clearance 402 (e.g., distance, gap) between the concave surface 308 of the pivotable bollard 210 and the concave surface 204 of the first fixed bollard 202, which may create frictional force on the line 106 threaded between the pivotable bollard 210 and the first fixed bollard 202 without locking the line 106 to preclude movement. In some embodiments, the first fixed bollard 202 may include a cam or lever connected to the first fixed bollard 202 to increase the friction force on a line 106 threaded between the pivotable bollard 210 and the first fixed bollard 202.

In order to apply a desired amount of friction on the line 106, a clearance (e.g., distance, gap) between the concave surfaces of either the first fixed bollard 202 or the second fixed bollard 206 and the concave surface 308 of the pivotable bollard 210 may be based on a diameter (D) of the line 106 threaded through the load support device 100. The diameter (D) of the line 106 may be from about 6 mm to about 20 mm, and more particularly from about 11 mm to about 15 mm (e.g., 13 mm). The diameter (D) of the line 106 may also depend on the material of the line 106. For example, a rope made of various types of fiber may have a larger diameter than a rope made of steel or a metal alloy.

While the pivotable bollard 210 is in the unactivated position, the clearance 402 between the concave surface 204 of the first fixed bollard 202 and the concave surface 308 of the pivotable bollard 210 may be from about 1.1D to about 2D, and more particularly from about 1.2D to about 1.4D (e.g., about 1.3D). Similarly, while the pivotable bollard 210 is in the unactivated position, the clearance between the concave surface 208 of the second fixed bollard 206 and the concave surface 308 of the pivotable bollard 210 may be from about 1.1D to about 2D, and more particularly from about 1.2D to about 1.4D (e.g., about 1.3D).

While the pivotable bollard 210 is in the activated position, the clearance 402 between the concave surface 204 of the first fixed bollard 202 and the concave surface 308 of the pivotable bollard 210 may be reduced. For example, the clearance 402 between the concave surface 204 of the first fixed bollard 202 and the concave surface 308 of the pivotable bollard 210 may be from about 0.25D to about 2D, and more particularly from about 0.5D to about 1D (e.g., about 0.75D). While the pivotable bollard 210 is in the activated position, the clearance between the concave surface 208 of the second fixed bollard 206 and the concave surface 308 of the pivotable bollard 210 may be increased. For example, the clearance between the concave surface 208 of the second fixed bollard 206 and the concave surface 308 of the pivotable bollard 210 may be from about 1.1D to about 2.5D, and more particularly from about 1.25D to about 2D (e.g., about 1.5D).

The amount of rotational movement of the pivotable bollard 210 and the friction applied to the line 106 may also depend on how the line 106 is threaded through the body 102 (i.e., line 106 configuration) and the magnitude of the load or force applied to the line 106.

Figure 5:
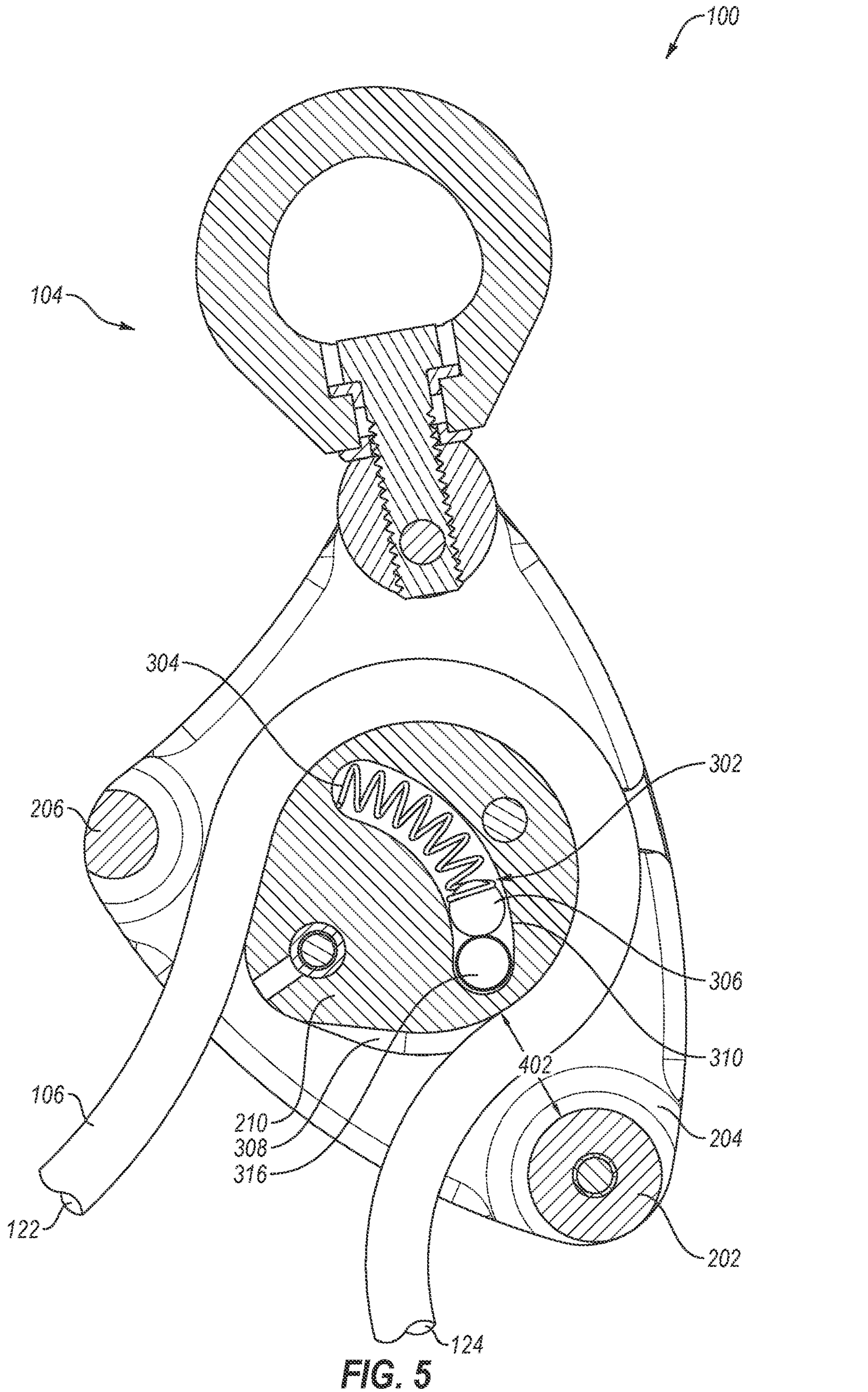
FIG. 5 is a cross-sectional view of the load support device of FIG. 1 in a closed state showing a portion of line therein in a first line configuration.

FIG. 5 illustrates a cross-sectional view of the load support device 100 in the first line configuration. In the first line configuration, the line 106 may be threaded between the second fixed bollard 206 and pivotable bollard 210, around the pivotable bollard 210, and between the pivotable bollard 210 and the first fixed bollard 202, which creates a tight "S" bend in the line 106. A first end 122 of the line 106 may extend out of the body 102 between the pivotable bollard 210 and the second fixed bollard 206 and a second end 124 (e.g., the control end) of the line 106 may extend out of the body 102 between the pivotable bollard 210 and the first fixed bollard 202. In this configuration, when a force is applied to a first end 122 end of the line 106, the line 106 may freely move through the body 102. When a force is applied the second end 124 and/or simultaneously applied to both ends of the line 106, a clockwise moment is created, which may pivot the pivotable bollard 210 toward the first fixed bollard 202 and create frictional force on the line 106 between the concave surface 308 of the pivotable bollard 210 and the concave surface 204 of the first fixed bollard 202. Depending on the magnitude of the force applied (e.g., magnitude of the clockwise moment), the pivotable bollard 210 may sufficiently rotate to reduce the clearance 402 to be less than the diameter of the line 106 and clamp (i.e., stop movement of) the line 106. The biasing element 302 creates an opposing (e.g., counterclockwise) moment within the pivotable bollard 210 such that the pivotable bollard 210 returns to an unrotated position once the load on either end of the line 106 is reduced or removed. The biasing element 302 may prevent the pivotable bollard 210 from rotating and applying friction to the line 106 under a minimum threshold rotational force applied (e.g., by the line 106) along a concave surface 308 of the pivotable bollard 210. For example, the pivotable bollard 210 may not rotate until the force applied on the pivotable bollard 210 by the line 106 exceeds the threshold force. The threshold force may be from about 1 Newton (N) to about 500 N, and more particularly from about 50 N to about 250 N (e.g., 130 N). The corresponding threshold moment or torque to rotate the pivotable bollard 210 may vary based on the size of the pivotable bollard and/or distance between the securing point 118 and the outer diameter of the pivotable bollard. As a non-limiting example, the threshold moment may be from about 0.01 Newton-meter (N·m) to about 10 N·m and more particularly from about 0.1 N·m to about 5 N·m (e.g., about 2 N·m). This may facilitate lowering of light loads and pulling slack of the line 106 through the body 102.

Figure 6:
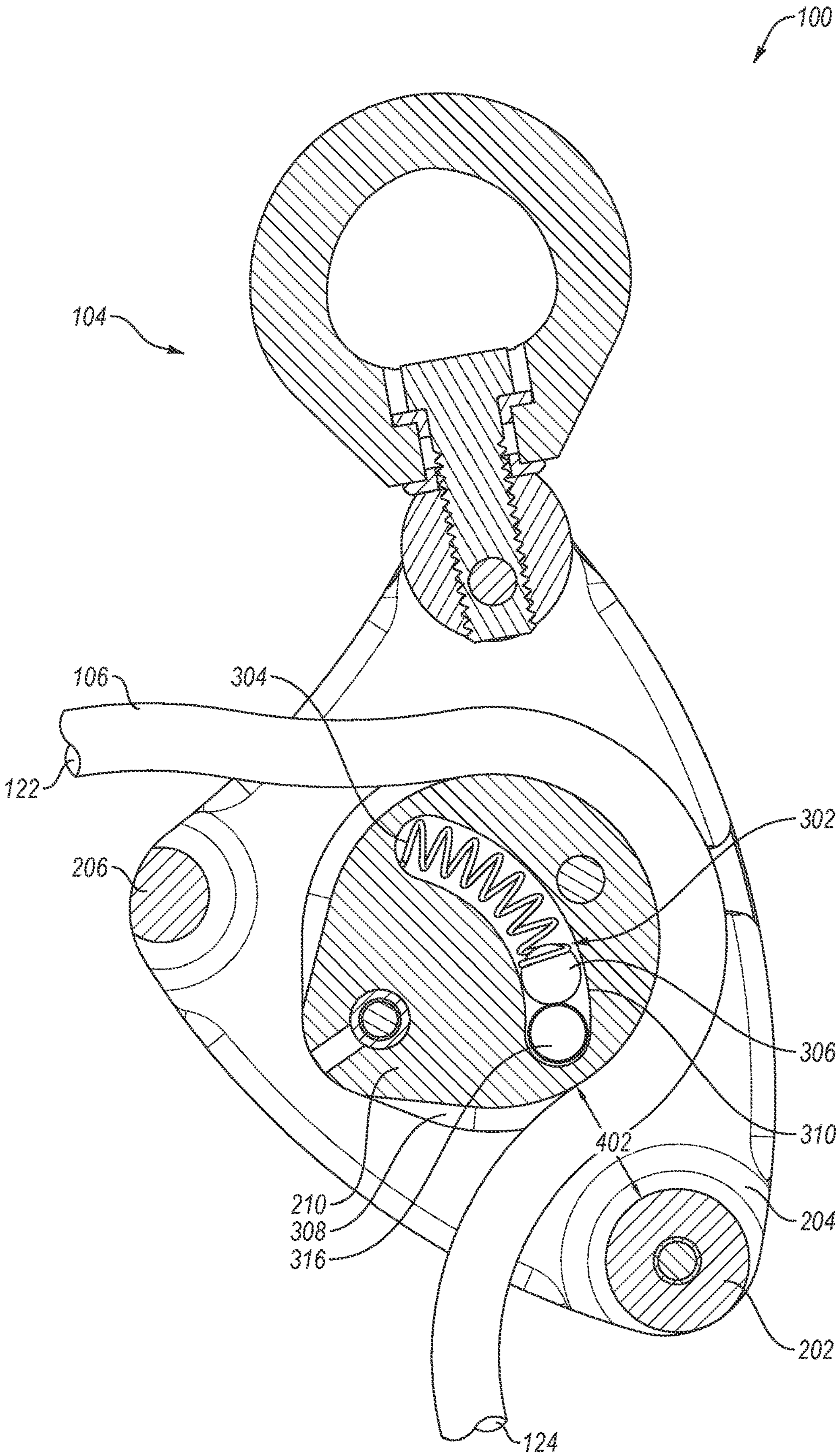
FIG. 6 is a cross-sectional view of the load support device of FIG. 1 in a closed state showing a portion of line therein in a second line configuration.

FIG. 6 illustrates a cross-sectional view of the load support device 100 in the second line configuration. In the second line configuration, the line 106 may be threaded between the second fixed bollard 206 and the attachment element 104, around the pivotable bollard 210, and between the pivotable bollard 210 and the first fixed bollard 202, which creates a loose "S" bend in the line 106. The first end 122 of the line 106 may extend out of the body 102 and above the second fixed bollard 206 and the second end 124 (e.g., the control end) of the line 106 may extend out of the body 102 and below the first fixed bollard 202. In this configuration, when a force is applied to the first end 122 of the line 106, the line 106 may freely move through the body 102. When a force is applied to the second end 124, a clockwise moment is created, which may pivot the pivotable bollard 210 toward the first fixed bollard 202 and create frictional force on the line 106 between the concave surface 308 of the pivotable bollard 210 and the concave surface 204 of the first fixed bollard 202. Because the line 106 is threaded between the second fixed bollard 206 and the attachment element 104 in this line configuration, the second fixed bollard 206 will absorb part of a force of the applied to the second end 124 of the line 106. Therefore, a force applied to the second end 124 of the line 106 in the second line configuration will result in less rotational movement of the pivotable bollard 210 than a force of the same magnitude applied to the second end of the line 106 in the first line configuration.

Figure 7:
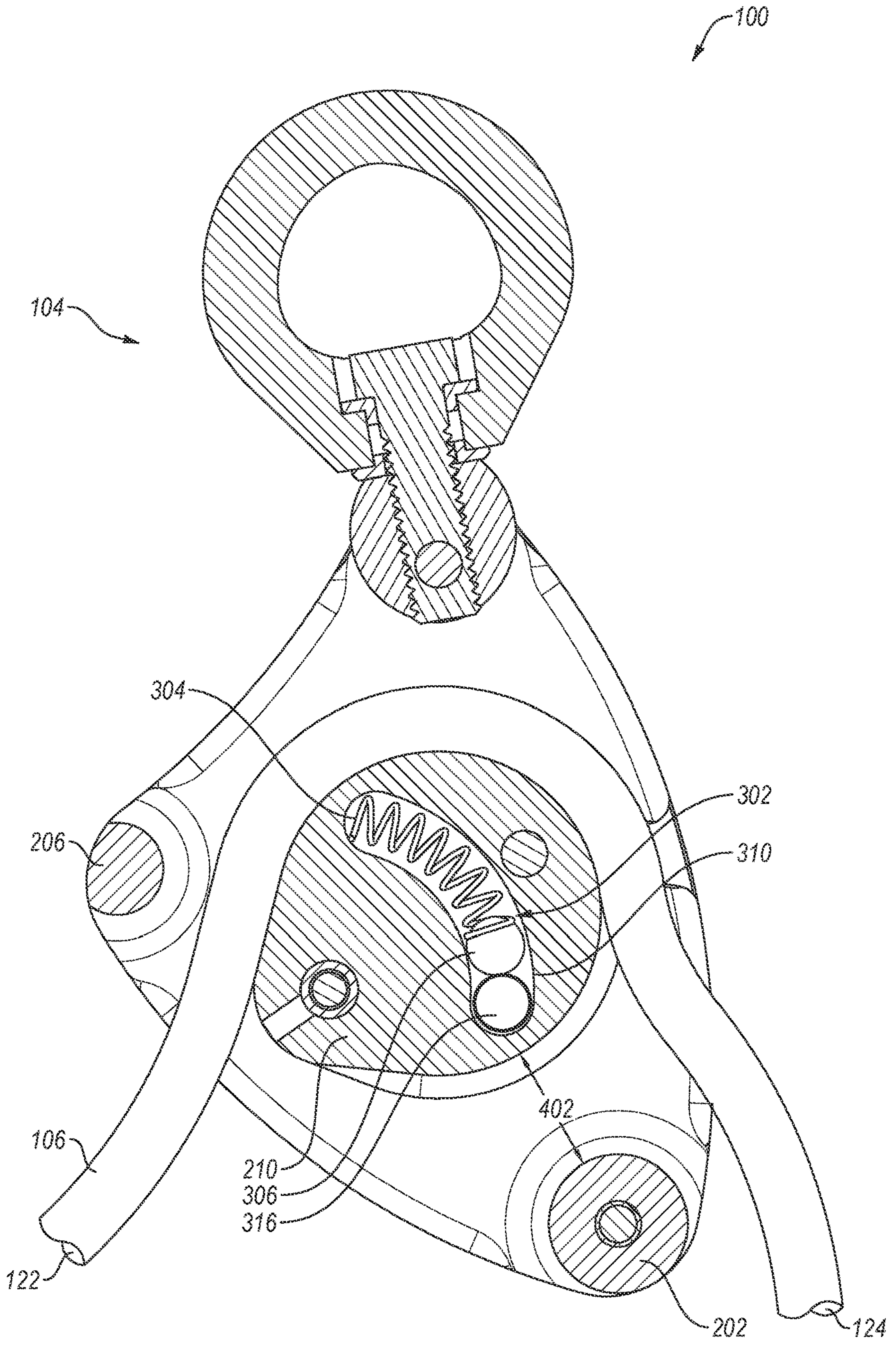
FIG. 7 is a cross-sectional view of the load support device of FIG. 1 in a closed state showing a portion of line therein in a third line configuration.

FIG. 7 illustrates a cross-sectional view of the load support device 100 in the third line configuration. In the third line configuration, the line 106 may be threaded between the second fixed bollard 206 and the pivotable bollard 210 and around the pivotable bollard 210, which creates a "U" bend in the line 106. In this configuration, when a force is applied to the first end 122 of the line 106, the line 106 may freely move through the body 102. Similarly, when a force is applied to the second end 124 of the line 106, the line 106 may freely move through the body 102. A force applied to the second end 124 of the line 106 may create a rotational (e.g., clockwise) moment about the pivotable bollard 210, which may rotate the pivotable bollard 210. However, the line 106 is not threaded between the first fixed bollard 202 and the pivotable bollard 210 so the reduction in clearance 402 will not apply frictional force to the line 106.

Figure 8:
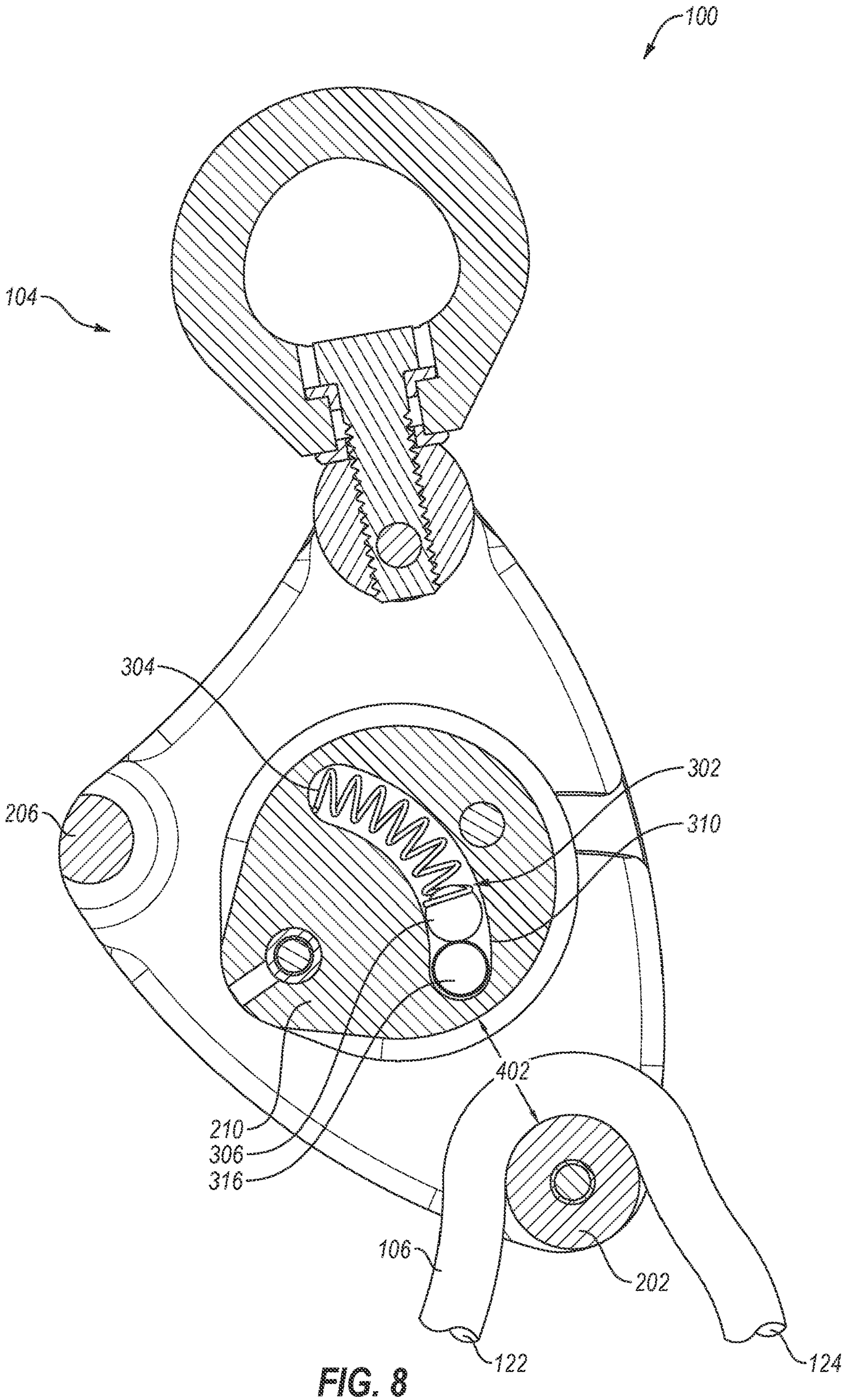
FIG. 8 is a cross-sectional view of the load support device of FIG. 1 in a closed state showing a portion of line therein in a fourth line configuration.

FIG. 8 illustrates a cross-sectional view of the load support device 100 in the fourth line configuration. In the fourth line configuration, the line 106 may be threaded between the first fixed bollard 202 and the pivotable bollard 210, which creates a "U" bend in the line 106. In this configuration, when a force is applied to the first end 122 of the line 106, the line 106 may freely move through the body 102. Similarly, when a force is applied to the second end 124 of the line 106, the line 106 may freely move through the body 102.

Figure 9:
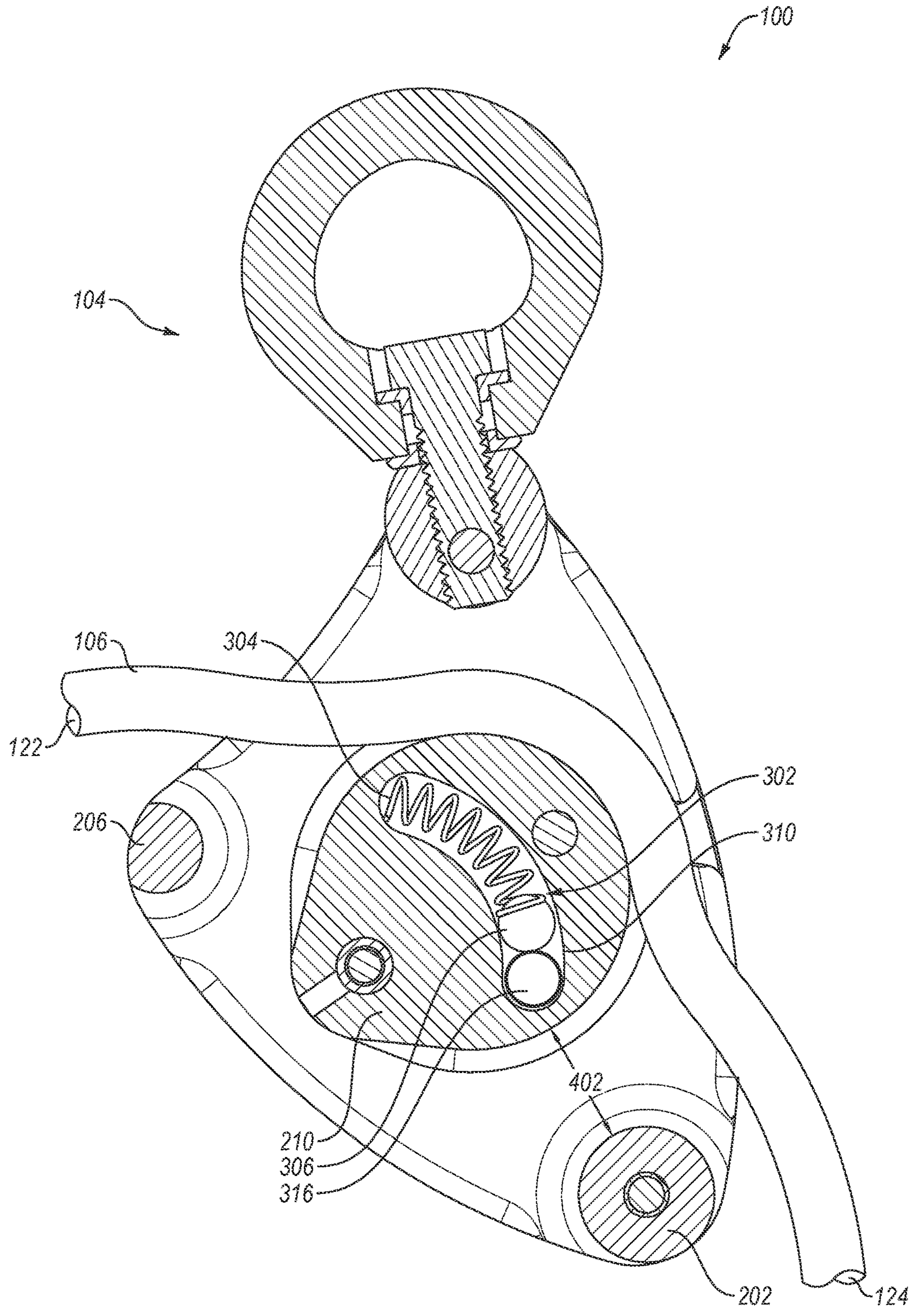
FIG. 9 is a cross-sectional view of the load support device of FIG. 1 in a closed state showing a portion of line therein in a fifth line configuration.

FIG. 9 illustrates a cross-sectional view of the load support device 100 in the fifth line configuration. In the fifth line configuration, the line 106 may be threaded between the second fixed bollard 206 and the pivotable bollard 210 and around the pivotable bollard 210, which creates an arcuate bend in the line 106. In this configuration, when a force is applied to the first end 122 of the line 106, the line 106 may freely move through the body 102. Similarly, when a force is applied to the second end 124 of the line 106, the line 106 may freely move through the body 102.

Figure 10:
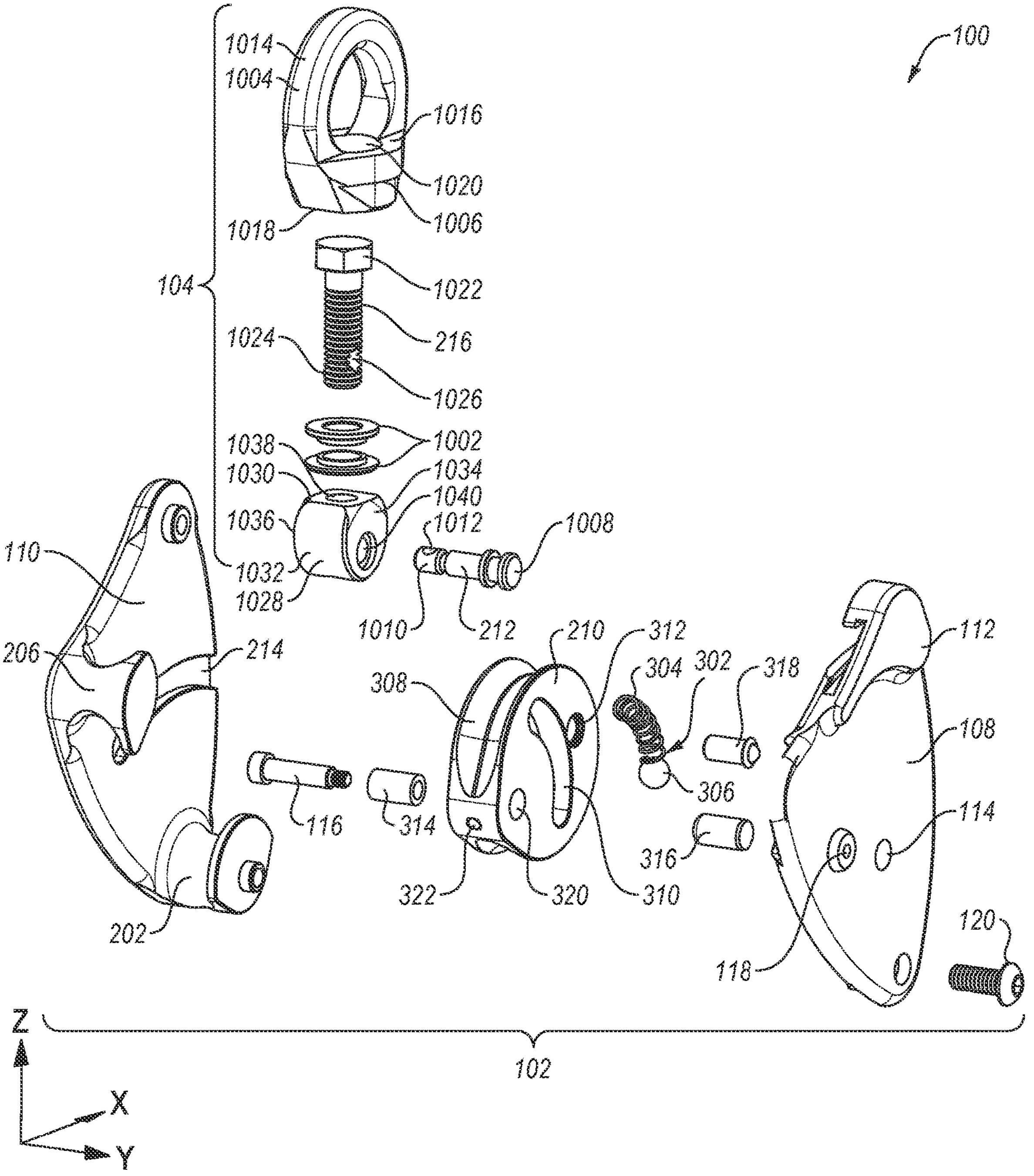
FIG. 10 is an exploded perspective view of components of the load support device of FIG. 1.

FIG. 10 illustrates an exploded view of the load support device 100. In some embodiments, the attachment element 104 may include a hook element 1004 coupled to a hub 1028 by the third elongated structure 216. The hub 1028 may be coupled to the first plate 108 and the second end 1024 of the third elongated structure 216 by a second elongated structure 212. In some embodiments, the attachment element 104 may additionally include rotational support elements 1002 (e.g., washers, bushings, rolling element bearings, etc.) positioned between the hook element 1004 and the hub 1028 and/or between the third elongated structure 216 and the hook element 1004 to facilitate rotation.

In some embodiments, the hook element 1004 may include a round portion 1014 and a base portion 1006. The base portion 1006 may include a first surface 1016 and a second surface 1018 opposite and substantially parallel to the first surface 1016. The second surface 1018 may abut the hub 1028 or another component of the attachment element 104 assembly. In some embodiments, the round portion 1014 and the base portion 1006 may form a fully closed loop. In other embodiments, the round portion 1014 may be open and form a letter-shaped hook (e.g., S-shape, J-shape, U-shape). The round portion 1014 may include rounded exterior edges to prevent the line 106 from fraying along the interior edges of the round portion 1014. The base portion 1006 may include a cavity 1020 within the first surface 1016. In some embodiments, the cavity 1020 may extend only partially through the base portion 1006. A smaller (e.g., smaller diameter) hole may be axially aligned with the cavity 1020 and may extend from an interior surface of the cavity 1020 through the remaining base portion 1006, which is illustrated in FIGS. 3-9.

Continuing with FIG. 10, the hub 1028 may include a first side surface 1034, a second side surface 1036 opposite the first side surface 1034, a rounded surface 1032 connecting the first side surface 1034 and the second side surface 1036, and a planar surface 1030 connected to each of the first side surface 1034, the second side surface 1036, and the rounded surface 1032. The hub 1028 may include a first hole 1038 perpendicular to and extending from the planar surface 1030 through the hub 1028. In some embodiments, the first hole 1038 may be centrally located between the first side surface 1034 and the second side surface 1036. The hub 1028 may additionally include a second hole 1040 perpendicular to and extending from the first side surface 1034 through the hub 1028. A central axis of the second hole 1040 may intersect a central axis of the first hole 1038. In some embodiments, the first hole 1038 may be larger (e.g., larger diameter) than the second hole 1040. In other embodiments, the second hole 1040 may be larger (e.g., larger diameter) than the first hole 1038.

The third elongated structure 216 may include a first end 1022 and a second end 1024. The first end 1022 may be larger (e.g., larger diameter) than the second end 1024. The first end 1022 may be connected to the base portion 1006 of the hook element 1004. In some embodiments, the first end 1022 may be smaller than the cavity 1020, but larger than the through hole and positioned within the cavity 1020 of the base portion 1006. One or more rotational support elements 1002 may be positioned within the cavity 1020 and axially aligned with the third elongated structure 216 received within the cavity 1020. In some embodiments, at least one of the rotational support elements 1002 may be positioned axially between the hook element 1004 and the hub 1028 to facilitate relative rotational motion between the hook element 1004 and the hub 1028 (e.g., about the Z-axis).

The second end 1024 of the third elongated structure 216 may be received within the first hole 1038 of the hub 1028. In some embodiments, the second end 1024 of the third elongated structure 216 may include a hole 1026 perpendicular to a length (e.g., axial direction) of and extending through the third elongated structure 216. The hole 1026 may be substantially the same size (e.g., diameter) as the second hole 1040 of the hub 1028.

The second elongated structure 212 may include a first end 1008 and a second end 1010. The first end 1008 may be connected to the first plate 108 and the second end 1010 may be connected to the second plate 110. The second end 1010 of the second elongated structure 212 may be received within the second hole 1040 of the hub 1028. In some embodiments the second elongated structure 212 may include a flange on the first end 1008 larger than the second hole 1040 of the hub 1028. The flange on the first end 1008 may positionally secure the hub 1028 between the second plate 110 and the third elongated structure 216.

In some embodiments, the second elongated structure 212 may be received within hole 1026 of the third elongated structure 216. In these embodiments, the second elongated structure 212 may be solid without the hole 1012. In other embodiments, the second elongated structure 212 may include a hole 1012 perpendicular to a length (e.g., axial direction) of and extending through the second elongated structure 212. The hole 1012 may be substantially the same size (e.g., diameter) as the first hole 1038 of the hub 1028. The hole 1012 may receive the second end 1024 of the third elongated structure 216. In these embodiments, the second end 1024 of the third elongated structure 216 may be solid without the hole 1026.

Figure 11:
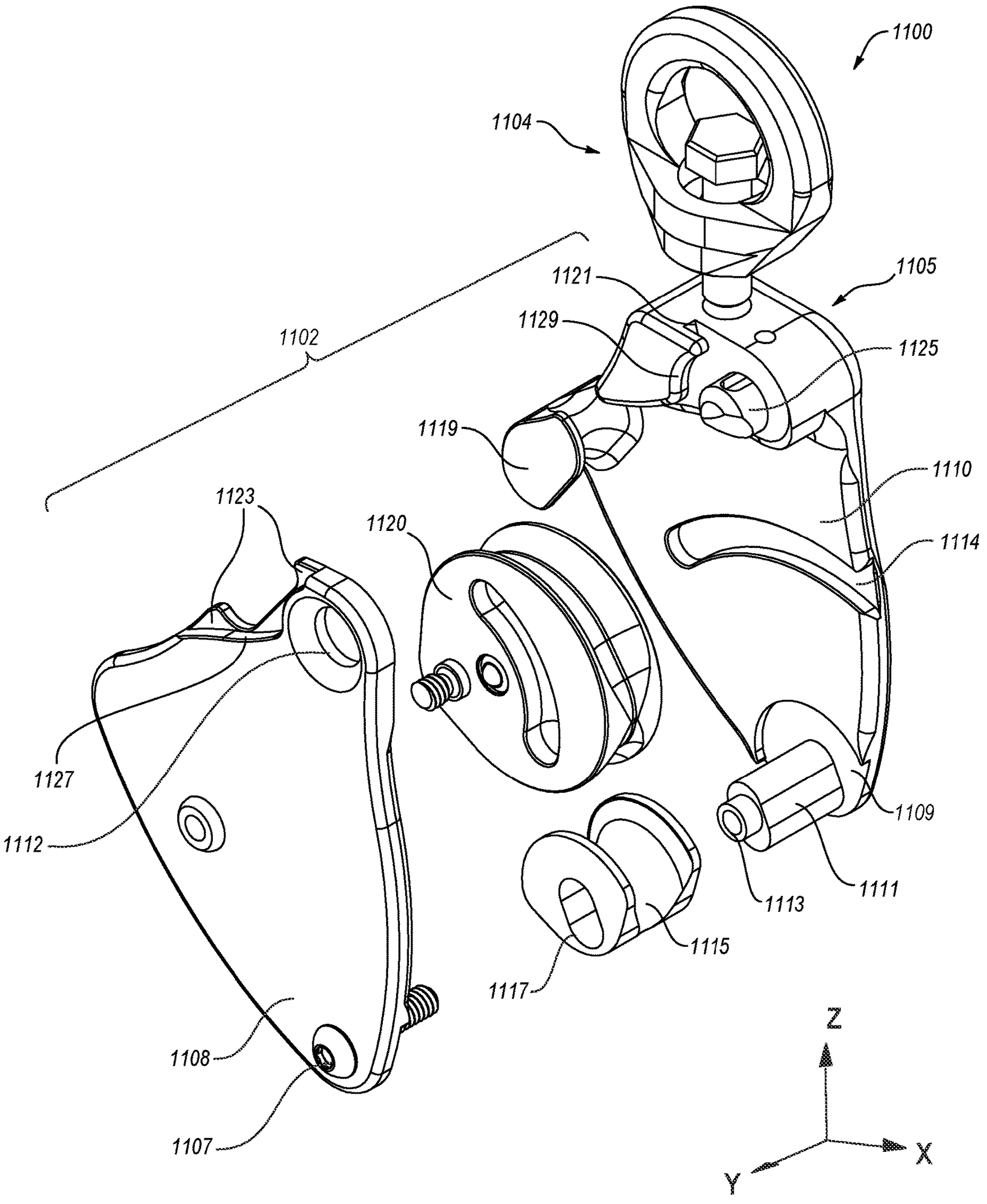
FIG. 11 is an exploded perspective view of components of another embodiment of a load support device.

FIG. 11 illustrates an exploded perspective view of a load support device 1100, in accordance with another embodiment of the disclosure. Unless otherwise described below, a feature of FIG. 11 will be understood to be similar (e.g., in terms of structure, materials, functionality, etc.) to a corresponding feature of the load support device 100 (FIGS. 1-10). The load support device 1100 may be configured to receive a line (e.g., line 106 (FIG. 1)) threaded through the load support device 1100, and the line may be coupled to a load as part of a load support system. The line may be threaded through the load support device 1100 in any of the configurations described in FIGS. 5-9. To facilitate threading the line through the load support device 1100, the load support device 1100 may transition from a closed state to an open state.

The load support device 1100 may include a body 1102 and an attachment element 1104 connected to the body 1102. The body 102 generally includes a first plate 1108, a second plate 1110, a first fixed bollard 1115, a second fixed bollard 1119, and a pivotable bollard 1120. The first fixed bollard 1115, the second fixed bollard 1119, and the pivotable bollard 1120 may be connected to the first plate 1108 and/or the second plate 1110 and positioned between the first plate 1108 and the second plate 1110.

As illustrated in FIG. 11, the first fixed bollard 1115 may be configured to connect to the second plate 1110. In some embodiments, the first fixed bollard 1115 may be configured to connect to the second plate 1110 proximate an exterior edge of the second plate 1110. For example, the second plate 1110 may include a recessed surface 1109 configured to connect to (e.g., abut) a surface of the first fixed bollard 1115. Additionally, the first fixed bollard 1115 may define an interior hole 1117 extending through and between side surfaces of the first fixed bollard 1115 so that the first fixed bollard 1115 may receive a post 1111 connected to (e.g., secured to) the second plate 1110. To prevent unintentional rotation and/or movement of the first fixed bollard 1115 when the load support device 1100 is in operation, and to facilitate assembly of the first fixed bollard 1115, the recessed surface 1109 may be substantially the same size and shape as the corresponding surface of the first fixed bollard, and the interior hole 1117 may be substantially the same size and shape as the post 1111. Furthermore, the post 1111 may define an interior hole 1113 configured to receive a fastener 1107 extending through the first plate 1108 such that the fastener 1107 rotatably connects the first plate 1108 to the second plate 1110. The load support device 1100 may be configured to transition between a closed state and an open state by rotating the first plate 1108 relative to the second plate 1110 about the fastener 1107.

As illustrated in FIG. 11, the first fixed bollard 1115 may be formed separately from the second plate 1110. Forming the first fixed bollard 1115 separately from the second plate 1110 may facilitate flexibility and may reduce costs associated with replacing worn components. The second plate 1110 including the recessed surface 1109 and/or the post 1111 may also facilitate disassembly and replacement of the first fixed bollard 1115. Although FIG. 11 illustrated the first fixed bollard as being separable from the second plate 1110, in some embodiments, the second fixed bollard 1119 may also be formed separately from the second plate 1110 in a substantially similar manner.

The second fixed bollard 1119 may be connected (e.g., secured) to the second plate 1110 and may contact an interior surface of the first plate 1108 when the load support device 1100 is in the closed state. In some embodiments, the second fixed bollard 1119 may be connected to the second plate 1110 proximate another exterior edge of the second plate 1110. The pivotable bollard 1120 may be pivotably connected (e.g., pivotably secured) to the first plate 1108 and a portion of the pivotable bollard 1120 may connect to a groove 1114 of the second plate 1110 when the load support device 1100 is in the closed state. The pivotable bollard 1120 may also include a biasing element that biases the pivotable bollard 1120 rotationally away from the first fixed bollard 1115. When the load support device 1100 is in the closed state, the pivotable bollard 1120 may be configured to pivot toward the first fixed bollard 1115 responsive to an applied load.

To facilitate the load support device 1100 in transitioning between the closed state and the open state, the first plate 1108 may include an upper portion 1105. The upper portion 1105 may include a connection feature 1112 (e.g., hole) configured to receive an elongated structure 1125 (e.g., push button) connected to the second plate 1110. While the load support device 1100 is in a closed state, the elongated structure 1125 may extend through the connection feature 1112. The elongated structure 1125 may exhibit substantially the same size and shape as the connection feature 1112 so as to prevent unintentional rotation of the first plate 1108 relative to the second plate 1110 when the elongated structure 1125 is engaged with the connection feature 1112. The upper portion 1105 may include a biasing element that biases the elongated structure 1125 to the extended position (illustrated in FIG. 11) away from the upper portion 1105 of the second plate 1110. In other words, the elongated structure 1125 may remain extended unless depressed toward the upper portion 1105 of the second plate 1110. In additional embodiments, the elongated structure 1125 may include a sloped (e.g., chamfered, beveled, etc.) exterior surface such that application of a transverse force (e.g., perpendicular to the axis of the elongated structure 1125) with a sufficient magnitude may depress the elongated structure 1125 and enable relative rotation of the plates 1108, 1110. In additional embodiments, the connection feature 1112 may include sloped (e.g., chamfered, beveled, etc.).

To transition the load support device 1100 to the open state from the closed state, the elongated structure 1125 may be depressed into the second plate 1110 and the first plate 1108 may freely rotate relative to the second plate 1110. To facilitate transitioning the load support device 1100 from the open state to the closed state, the upper portion 1105 of the second plate 1110 may also include a groove 1121 configured to receive a corresponding tab portion 1123 of the first plate 1108. The first plate 1108 may also include a recessed portion 1127 configured to receive a corresponding tab portion 1129 of the upper portion 1105 of the second plate 1110. The groove 1121 may engage the corresponding tab portion 1123, and the recessed portion 1127 may engage the corresponding tab portion 1129 to provide an indication that the first plate 1108 is rotationally aligned with the second plate 1110 in the closed position. Once the groove 1121 is engaged with the corresponding tab portion 1123 and the recessed portion 1127 is engaged with the corresponding tab portion 1129, the elongated structure 1125 may extend away from the upper portion 1105 second plate 1110 and engage with the connection feature 1112 to secure the load support device 1100 in the closed position. The elongated structure 1125, the connection feature 1112, the groove 1121 and corresponding tab portion 1123, and/or the recessed portion 1127 and corresponding tab portion 1129 may facilitate opening and closing the load support device 1100. For example, the load support device 1100 may be capable of being opened or closed by a user with a single hand when the load support device 1100 is not coupled to the line or in an unloaded state. Additionally, when the line is threaded through the load support device 1100 in one of the line configurations of FIGS. 5-9 and attached to a load, forces on the load support device 1100 may bias the load support device 1100 into the closed state and prevent the load support device 1100 from opening. Similar to the load support device 100, the load support device 1100 biasing into the closed state during operation may improve safety and the reliability of the load support device 1100.

Embodiments of the present disclosure may enable a load support device to be positioned within a rigging system and out of reach of a user, while still enabling an operator or user to control the ascent and descent of a load. As described above, a load support device may function differently depending on the line configuration. For example, when lifting certain loads, one or more configurations may provide certain advantages to control the speed of the line and/or the friction applied to the line. A load support device capable of functioning in a desired way during rigging operations without real-time adjustments from a user may reduce user error and improve safety of rigging operations. Additionally, the load support device may self-orient to a position of least resistance with a line without real-time adjustments from a user, which may reduce the amount of energy needed to control loads during rigging operations. Self-orientation of the load support device may also reduce pinch-point hazards and therefore improve user safety for users during rigging operations.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A load support device, comprising:
a body comprising:
a first fixed bollard;
a pin secured to the body; and
a movable bollard,
wherein the movable bollard and the first fixed bollard are configured such that friction is applied to a line between the first fixed bollard and the movable bollard without locking the line to preclude movement in response to a force applied to the movable bollard; wherein the movable bollard comprises a biasing element configured to bias the movable bollard away from the first fixed bollard;
wherein the biasing element and the pin are located within a pocket on the movable bollard, the pocket including a radial groove including a radius centered about a pivot point of the movable bollard; and
wherein the biasing element and the pin are configured to limit rotational movement of the movable bollard.

2. The load support device of claim 1, wherein the line comprises a rope, strap, or cable.

3. The load support device of claim 1, wherein the biasing element is configured to prevent rotation of the movable bollard until a moment of at least 0.1 N·m is applied to the movable bollard in a direction opposite an opposing moment generated from the biasing element.

4. The load support device of claim 1, wherein the biasing element comprises a spherical element connected to a spring.

5. The load support device of claim 4, wherein the spring has a stiffness from about 2.5 N/mm to about 20 N/mm.

6. The load support device of claim 1, wherein the biasing element comprises a torsional spring comprising a first end connected to the body and a second end connected to the movable bollard.

7. The load support device of claim 6, wherein the torsional spring has a stiffness of from about 65 N/rad to about 450 N/rad.

8. A load support device, comprising:
a body comprising:
a first plate;
a second plate connected to the first plate;
a pin secured to the body;
a pivotable bollard connected to the first plate;
a first fixed bollard connected to the second plate; and
an attachment element connected to the body,
wherein the pivotable bollard and the first fixed bollard are configured such that friction is applied to a line between the first fixed bollard and the pivotable bollard without locking the line to preclude movement in response to a force applied to the pivotable bollard; and wherein the pivotable bollard comprises a biasing element configured to bias the pivotable bollard away from the first fixed bollard;
wherein the biasing element and the pin are located within a pocket on the pivotable bollard, the pocket including a radial groove including a radius centered about a pivot point of the pivotable bollard; and
wherein the biasing element and the pin are configured to limit rotational movement of the pivotable bollard.

9. The load support device of claim 8, wherein the attachment element comprises:
a hook element;
a first elongated structure connected to the hook element; and
a second elongated structure connected to the body and the first elongated structure.

10. The load support device of claim 8, wherein the attachment element is connected to the body and configured to rotate relative to the body about two independent axes.

11. The load support device of claim 8, the body further comprising a second fixed bollard connected to the second plate.

12. The load support device of claim 8, further comprising a biasing element configured to oppose rotational movement of the pivotable bollard.

13. The load support device of claim 12, wherein the pivotable bollard is secured to the first plate by an elongated structure, the pivotable bollard further comprises a radial pocket radially centered about the elongated structure, and wherein the biasing element is positioned within the radial pocket.

14. The load support device of claim 8, wherein the first plate comprises a connection feature configured to receive an elongated structure attached to the second plate.

15. The load support device of claim 14, wherein the elongated structure comprises a push button configured to extend and retract from an upper portion of the second plate, and the connection feature comprises a hole defined by the first plate and configured to receive the push button.

16. The load support device of claim 8, wherein the first plate comprises a tab portion configured to connect to a groove of the second plate.

17. A load support system, comprising:
an attachment element;
a body connected to the attachment element, the body comprising:
a first plate;
a second plate connected to the first plate;
a pin secured to the body;
a first fixed bollard connected to the second plate;
a second fixed bollard connected to the second plate;
a pivotable bollard connected to the first plate; and
a line threaded through the body,
wherein the pivotable bollard is configured to pivotably rotate toward the first fixed bollard and apply friction to the line without locking the line to preclude movement; and wherein the pivotable bollard comprises a biasing element configured to bias the pivotable bollard away from the first fixed bollard;
wherein the biasing element and the pin are located within a pocket on the pivotable bollard, the pocket including a radial groove including a radius centered about a pivot point of the pivotable bollard; and
wherein the biasing element and the pin are configured to limit the rotational movement of the pivotable bollard.

* * * * *